(No Model.)  3 Sheets—Sheet 1.
F. LAMBERT.
METER.
No. 569,137.  Patented Oct. 6, 1896.
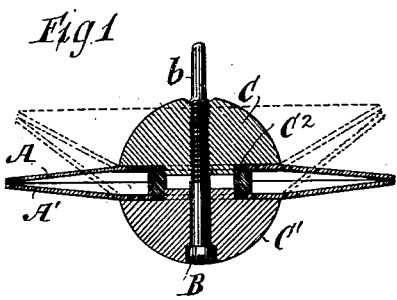
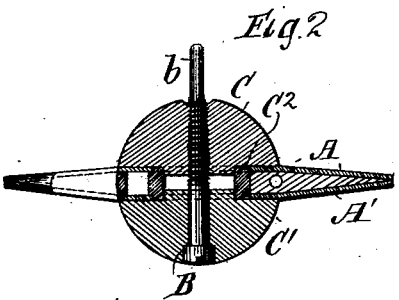
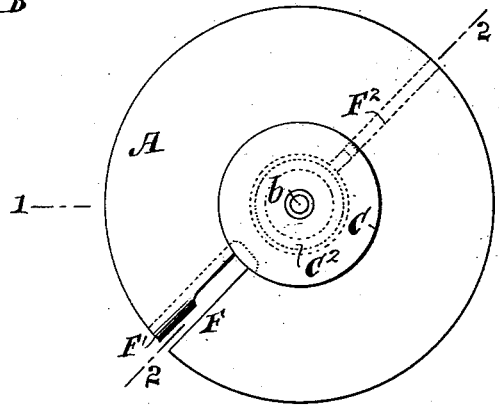
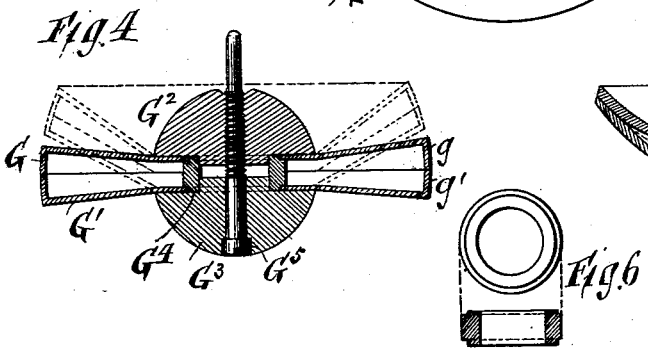
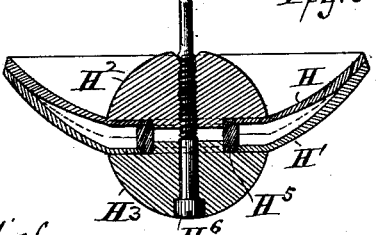
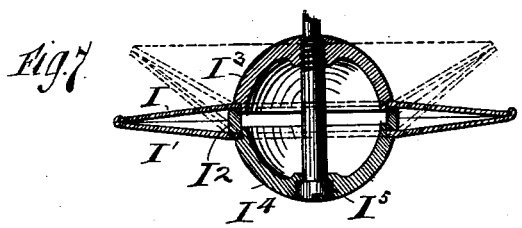
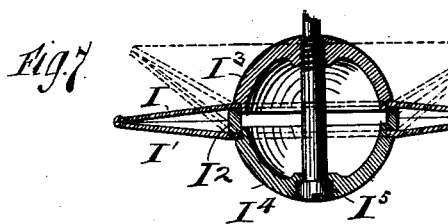
WITNESSES:
Pierson L. Wells.
Walter A. Pauling
INVENTOR,
Frank Lambert,
BY Edwin H. Brown
HIS ATTORNEY.

(No Model.) 3 Sheets—Sheet 2.

F. LAMBERT.
METER.

No. 569,137. Patented Oct. 6, 1896.

WITNESSES:
Pierson L. Wells
Walter A. Pauling

INVENTOR
Frank Lambert
BY
Edwin H. Brown
HIS ATTORNEY.

(No Model.)  F. LAMBERT.  3 Sheets—Sheet 3.
METER.

No. 569,137.  Patented Oct. 6, 1896.

WITNESSES:

INVENTOR
Frank Lambert
BY
his ATTORNEY

UNITED STATES PATENT OFFICE.

FRANK LAMBERT, OF BROOKLYN, NEW YORK, ASSIGNOR OF ONE-HALF TO JOSEPH W. KAY, OF SAME PLACE.

METER.

SPECIFICATION forming part of Letters Patent No. 569,137, dated October 6, 1896.

Application filed February 6, 1895. Serial No. 537,464. (No model.)

*To all whom it may concern:*

Be it known that I, FRANK LAMBERT, of Brooklyn, New York, have invented a certain new and useful Improvement in Meters, of which the following is a specification.

The present invention relates to meters which are employed for measuring fluids, and is directed toward improvements in that class of meters known as "nutating" or "oscillating" disk meters. It more particularly concerns improvements in those portions of the latter class of meters which comprise the disk or piston proper and its ball or sphere.

I will describe a piston and its ball or sphere embodying my improvement, and then point out the novel features in the claims.

Figure 13:
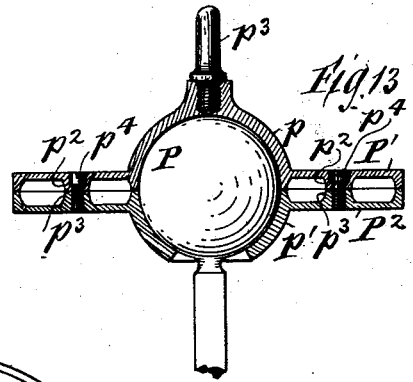
Figure 14:
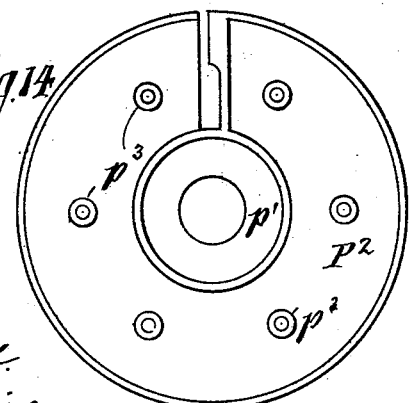
Figure 15:
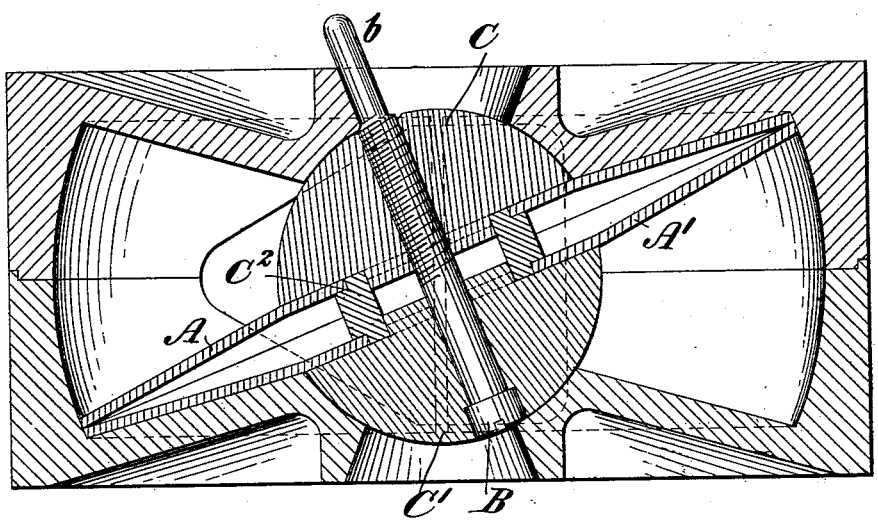

In the accompanying drawings, Figure 1 is a sectional view of a disk or piston proper embodying my improvement, showing also the ball carried by the piston in section, the section being taken on the plane of the line 1 1 of Fig. 3. Fig. 2 is a view similar to Fig. 1, taken on the plane of the line 2 2 of Fig. 3. Fig. 3 is a plan view of the piston shown in Figs. 1 and 2. Fig. 4 is a view similar to Fig. 1, but shows a modified form of construction. Fig. 5 is a view similar to Fig. 4, but illustrates a modification. Fig. 6 is a plan and cross-sectional view of a supporting-ring for a sectional piston. Figs. 7, 8, 9, 10, 11, and 12 are cross-sectional views similar to Fig. 1, showing various modified forms of pistons and the balls or spheres carried by the same. Fig. 13 represents a section similar to that shown in Fig. 1, illustrating a piston having an internal ball-bearing as well as a supporting-ball for the piston. Fig. 14 is a plan view of the piston represented in Fig. 13, and Fig. 15 is a view showing the piston in a meter-chamber.

Similar letters of reference designate corresponding parts in all figures.

I have shown in Fig. 1 a hollow piston comprising an upper plate A and a lower plate A', whose outer or peripheral portions are bent or inclined toward each other. The plates A A' are provided with a central aperture, through which passes a screw B, the latter serving to secure together and clamp upon the piston the spherical segments C C', constituting the ball carried by the piston.

A ring or annulus $C^2$, provided with a rabbeted edge or edges on its outer surface, may be interposed between the plates A A' constituting the piston, while the segments C C' may be suitably shouldered to engage with the inner edges of the annulus $C^2$. The screw B may be provided with a lengthened extremity $b$, forming the spindle of the piston.

It is not absolutely essential that the piston formed by the plates A A' should be flat or confined to a plane, as shown in full sectional view in Fig. 1, as the annular portion of the piston projecting beyond the segments C C' may be extended upward, for instance, as shown in dotted outline in that figure.

The construction shown in Figs. 2 and 3 is essentially similar to that shown in Fig. 1, but represents a method of preventing the circulation of the liquid through the interior of the piston.

A hollow piston, such, for instance, as that of the form described, when provided with the usual slot F (see Fig. 3) for the insertion of the diaphragm customarily used in meters of the oscillating-disk type, will leave a passageway within the disk extending from the inlet edge of the slot to the outlet edge of the same. Consequently if no provision is made liquid will pass from the inlet to the outlet of the meter without actuating the registering mechanism of the same. To prevent this flow, I provide an obstruction-piece extending across the line of flow. This obstruction-piece may be inserted in the piston close to the slot F, as shown as F', either at the inlet or the outlet side of the slot, but preferably at the latter, or the obstruction-piece may be inserted at a point removed from the slot-opening, as shown at $F^2$. The bottom of the slot F is also provided with a suitable closing piece or block. These obstruction-pieces and closing-blocks can be made of metal or other hard material, in which case they will be so disposed as to materially strengthen the piston in addition to preventing the leak of fluid. A soft material may be employed if the purpose is simply to obstruct the passage through the body of the piston.

Preferably I provide the slotted piston on one or both sides of the slot with a little extra metal or material to compensate for that portion cut away in forming the slot, thereby perfecting the balancing of the piston.

Figs. 4 and 5 represent views similar to that shown in Fig. 1, but of modified forms of pistons. Fig. 4 shows a piston embodying plates G G', having inwardly-extending outer edges $g$ $g'$, the piston being so formed as to be thicker at its outer or peripheral portion than at those portions lying adjacent to the segments $G^2$ $G^3$. The piston may be provided with a separating-annulus $G^4$ and screw $G^5$, as before. There is represented in dotted outline in Fig. 4 an alternative form in which the peripheral portions of the piston are extended upward.

Fig. 5 shows a piston comprising an upper plate H, a lower plate H', segments $H^2$ $H^3$, a separating-annulus $H^5$, and a screw $H^6$. The plates H H', constituting the piston, are both extended upward to conform to the surface of a sphere and caused to meet at their outer edges.

The construction shown in Fig. 7 comprises an upper plate I and a lower plate I', both provided with a central aperture encircled by an annulus $I^2$ interposed between the plates. The outer or peripheral edges of the plates approach and are shown to be in contact, while at the edges of the central aperture the plates I and I' are clamped down upon the annulus $I^2$ by the shouldered edges of the hollow segments $I^3$ $I^4$, drawn together by the clamping-screw $I^5$.

The outer edge of the lower plate I' may be bent upward and inward, inclosing the edge of the plate I.

Hollow pistons can also be made of flat plates of metal firmly secured together at or near their center portions, while at their peripheral portions the plates may be left free to slide over one another, thereby producing a piston having a small degree of a yielding or a springing quality. Such pistons are illustrated in Figs. 8 and 9.

Figure 8:
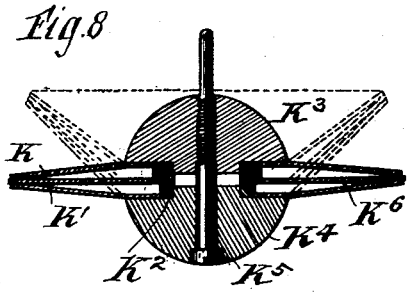

Referring to Fig. 8, K represents an upper plate, and K' a lower plate, held in engagement with the annulus $K^2$ by means of spherical segments $K^3$ $K^4$ and a binding-screw $K^5$. A circular plate $K^6$, having an interior aperture with the edges of which the annulus $K^2$ engages, extends outwardly therefrom between the upper and lower plates K K'. The peripheral edges of the latter plates are bent toward and rest upon the plate $K^6$, but are not attached thereto. To prevent cramping between the edges of the piston and the walls of the containing-chamber, I prefer to make the center plate $K^6$ fit closely to the wall of the chamber, while the diameter of the top and bottom plates K K' is made slightly less than that of the central plate, thereby leaving room for them to slide upon the center plate without thrusting themselves into the sides of the chamber.

Figure 9:
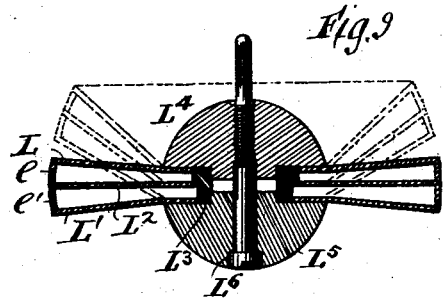

Fig. 9 shows a piston comprising an upper plate L and a lower plate L', provided with laterally-extending circumferential edges $e$ $e'$, projecting toward and resting upon the outer portion of a central plate $L^2$. The upper and lower plates L L' and the central plate $L^2$ engage with an annulus $L^3$, while the spherical segments $L^4$ and $L^5$ are clamped upon the piston by a screw $L^6$. The dotted outlines in Figs. 8 and 9 represent different forms in which the pistons may be made.

In the figures I have so far described I have represented the spherical segments forming the balls carried by the pistons as being independent of the pistons and secured or clamped thereto by suitable means. The segments are also shown as being provided with suitable lugs or shoulders, by which they are centered upon the pistons.

Figure 10:
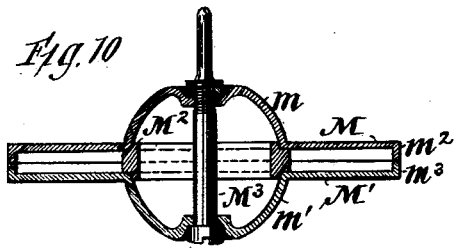
Figure 11:
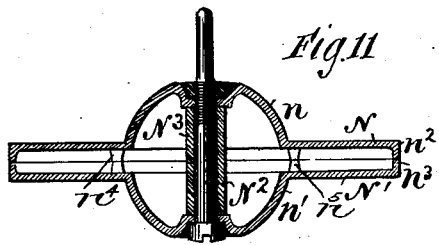
Figure 12:
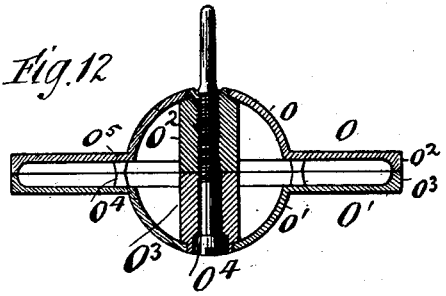

In Figs. 10, 11, and 12 I have shown hollow pistons in which hollow segments forming the ball are made integral with the respective sections of the piston. When so constructed, they may be made by casting, or by spinning, or stamping.

When the top or bottom of the piston is made of thin metal, of one piece with the ball-section, by spinning or stamping, I may reinforce the top center of the integral segment by the addition of a piece thick enough to receive a good screw-thread for engaging with the clamping-screw, or a nut at both the top and bottom can be used to engage with the threaded shaft of a straight threaded wire which may be prolonged to form the drawing-spindle of the piston.

In Fig. 10, M represents the upper plate of the piston provided with a central spherical enlargement $m$, and M' the lower plate of the piston provided with a spherical enlargement $m'$. The plates M and M' are provided with laterally-extending circumferential edges $m^2$ $m^3$. A shouldered annulus $M^2$ is inserted between the plates at their inner edges. $M^3$ is the clamping-screw. It may be provided with an integral head and is threaded for a portion of its length to engage with a nut by means of which the two sections of the piston are secured together. If found desirable, these portions of the spherical enlargements $m$ and $m'$ which contact with the head and nut of the screw may be depressed inward to form pockets for the reception of the head and nut. In order to prevent the distortion of the ball by clamping the parts of the piston too tightly together, I may provide a separator in the form of a tube through which the clamping-screw extends. This construction is illustrated in Fig. 11, in which an upper plate N, carrying a central spherical enlargement $n$, and a lower plate N', carrying a central spherical enlargement $n'$, are secured together by a screw $N^2$. The plates N N' are provided, as in Fig. 10, with laterally-extending circumferential edges $n^2$ $n^3$ and strengthening-ribs $n^4$ and $n^5$. $N^3$ is a separator formed from a short tube and abutting at opposite ends against the interior surfaces of the spherical enlargements $n$ and $n'$.

Fig. 12 represents a modified form of the piston shown in Fig. 11, in which the upper plate O of the piston is provided with a spherical enlargement $o$, while the lower plate O' is also provided with a spherical enlargement $o'$. The spherical enlargements $o$ and $o'$ are both provided with openings in which are secured short tubular posts $O^2$ and $O^3$, respectively, by any suitable means, riveting, for instance. The plates O and O' are provided with laterally-extending edges $o^2$ $o^3$ at their peripheral portions whose adjacent surfaces, as well as those of the posts $O^2$ and $O^3$, abut against each other when the two plates O and O' are drawn together by the clamping-screw $O^4$. Strengthening ribs or lugs $o^4$ and $o^5$ are also provided on the interior surfaces of the plates.

Referring to Fig. 13, P is a supporting-ball carrying a piston comprising an upper plate P' and a lower plate $P^2$. The upper plate P' is provided with a spherical enlargement $p$, whose inner surface forms the bearing for the upper portion of the supporting-ball. This spherical enlargement may be provided with a thickened portion to serve for the attachment of the screw-threaded end of the spindle $P^3$. The lower plate is provided with a spherical enlargement $p'$, open at the bottom. The plates P' and $P^2$ are preferably provided with an inwardly-extending lug or lugs $p^2$ $p^3$, while their circumferential edges are extended inward and abut against each other. Screws $p^4$ are provided, securing the plates P' and $P^2$ together. Although I have not mentioned it, it is evident that dowel or centering pins and corresponding recesses may be provided in the adjacent faces of the sections of the pistons for the purpose of centering them in assembling the parts.

I have mentioned screws and rivets for securing the sections of the pistons together; but these sections may be secured together by soldering and will form a substantial and serviceable piston. Furthermore, if the sections of the piston are so secured together as to render the piston water-tight it will be advisable to supply the interior of the piston with strengthening lugs and ribs to prevent collapsing of the piston from excessive pressure of the liquid being measured.

If a water-tight construction for a hollow piston is adopted, the buoyancy of the latter will be increased to a degree dependent upon the size of the piston and the weight of metal used in its construction.

Having described my invention, what I consider as new, and desire to secure by Letters Patent, is—

1. In a meter of the nutating type a hollow piston, provided with means for preventing the passage through said piston of the actuating flow, substantially as described.

2. In a meter of the nutating type, a hollow piston having a transverse wall or partition closing the passage through said piston of the actuating flow.

3. In a meter, the combination with a piston-chamber, and a hollow nutating piston made in sections, of a central spindle connecting the top and bottom sections of the ball supported by the piston, and an obstruction-piece for preventing the passage of a liquid through the hollow space of the piston, substantially as specified.

4. In a meter, the combination with a piston-chamber and a diaphragm, of a nutating piston the plates forming the piston being inclined toward each other at their outer or peripheral portions and there being a hollow space between the plates at their outer or peripheral portions, substantially as specified.

5. In a water-meter, the combination with a piston-chamber, a diaphragm and registering mechanism, of a piston formed of an inner plate and outer plates free to slide at their outer edges upon one another, substantially as specified.

6. In a meter, the combination with a piston-chamber and a diaphragm, of a hollow nutating piston, made in sections a ball made in sections carried by the piston a central spindle or screw passing through the ball-sections, internal ribs or lugs for supporting the sections of the piston and means for preventing the passage of the liquid through the hollow space of the piston, substantially as specified.

In testimony whereof I have signed my name to this specification in the presence of two subscribing witnesses.

FRANK LAMBERT.

Witnesses:
 ANTHONY GREF,
 PIERSON L. WELLS.